US011675617B2

(12) United States Patent
Herring et al.

(10) Patent No.: US 11,675,617 B2
(45) Date of Patent: Jun. 13, 2023

(54) SENSOR-ENABLED PRIORITIZATION OF PROCESSING TASK REQUESTS IN AN ENVIRONMENT

(71) Applicant: Toshiba Global Commerce Solutions Holdings Corporation, Tokyo (JP)

(72) Inventors: Dean Frederick Herring, Youngsville, NC (US); Adrian Xavier Rodriguez, Durham, NC (US); Abhishekh Padmanabhan, Cary, NC (US); David A. Bernath, Cary, NC (US); David John Steiner, Raleigh, NC (US); Phuc Ky Do, Morrisville, NC (US); Jonathan M. Waite, Cary, NC (US); Brad Matthew Johnson, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 207 days.

(21) Appl. No.: 15/927,853

(22) Filed: Mar. 21, 2018

(65) Prior Publication Data
US 2019/0294468 A1 Sep. 26, 2019

(51) Int. Cl.
*G06F 9/48* (2006.01)
*G06Q 30/0601* (2023.01)
*G06N 3/08* (2023.01)

(52) U.S. Cl.
CPC ....... *G06F 9/4831* (2013.01); *G06Q 30/0641* (2013.01); *G06N 3/08* (2013.01)

(58) Field of Classification Search
None
See application file for complete search history.

(56) References Cited

U.S. PATENT DOCUMENTS

| 7,034,679 | B2 | 4/2006 | Flynn |
| 9,015,069 | B2 | 4/2015 | Brantley et al. |
| 9,531,608 | B1 | 12/2016 | Samuelson et al. |
| 9,569,672 | B2 * | 2/2017 | Bobbitt ............. G06K 9/00771 |
| 2007/0027806 | A1 | 2/2007 | Sands et al. |
| 2008/0184245 | A1 | 7/2008 | St-Jean |

(Continued)

FOREIGN PATENT DOCUMENTS

| CA | 3034834 A1 | 9/2019 |
| EP | 3101511 A1 | 12/2016 |

OTHER PUBLICATIONS

Requistion by Examiner for Application No. 3,034,834 dated May 4, 2020.

(Continued)

*Primary Examiner* — Lewis A Bullock, Jr.
*Assistant Examiner* — Melissa A Headly
(74) *Attorney, Agent, or Firm* — Patterson + Sheridan, LLP

(57) ABSTRACT

Method, computer program product, and system to prioritize the execution of processing task requests in a task request queue, where the processing task requests are related to an environment. The method includes adding processing task requests to a task request queue in response to the detection of predefined actions in an environment. The method also includes adding additional processing task requests or adjusting a priority level of not yet completed task requests in the task request queue, in response to detecting subsequent predefined actions in the environment.

17 Claims, 10 Drawing Sheets

(56) References Cited

U.S. PATENT DOCUMENTS

| | | |
|---|---|---|
| 2013/0238378 A1 | 9/2013 | Connolly et al. |
| 2014/0157209 A1* | 6/2014 | Dalal ..................... G06F 3/012 |
| | | 715/863 |
| 2015/0015480 A1 | 1/2015 | Burr |
| 2015/0221191 A1 | 8/2015 | Doyle et al. |
| 2016/0055236 A1 | 2/2016 | Frank et al. |
| 2016/0109954 A1* | 4/2016 | Harris ................. H04L 63/0861 |
| | | 345/156 |
| 2016/0259343 A1* | 9/2016 | High .................... G06K 9/6256 |
| 2017/0278368 A1 | 9/2017 | Burke |
| 2017/0287215 A1 | 10/2017 | Lalonde et al. |
| 2017/0289445 A1* | 10/2017 | Kumar ...................... G06T 7/33 |
| 2017/0312574 A1* | 11/2017 | Matsuzawa ............ A63B 71/06 |
| 2018/0239615 A1* | 8/2018 | Ravid ................ G06F 16/24568 |
| 2018/0293533 A1* | 10/2018 | Lowry ............. G06Q 10/06316 |
| 2019/0294468 A1 | 9/2019 | Herring et al. |

OTHER PUBLICATIONS

Innovation, Science and Economic Development Canada Requisition by Examiner for Application No. 3034834 dated Apr. 30, 2021.
Innovation, Science and Economic Development Canada Requisition by Examiner for Application No. 3034834 dated Dec. 20, 2021.

* cited by examiner

SENSOR-ENABLED PRIORITIZATION OF PROCESSING TASK REQUESTS IN AN ENVIRONMENT

BACKGROUND

The present disclosure relates to an environment comprising a plurality of items available for selection by one or more persons, such as a retail environment, and more specifically, to providing techniques to prioritize processing task requests in a task request queue.

Figure 1:
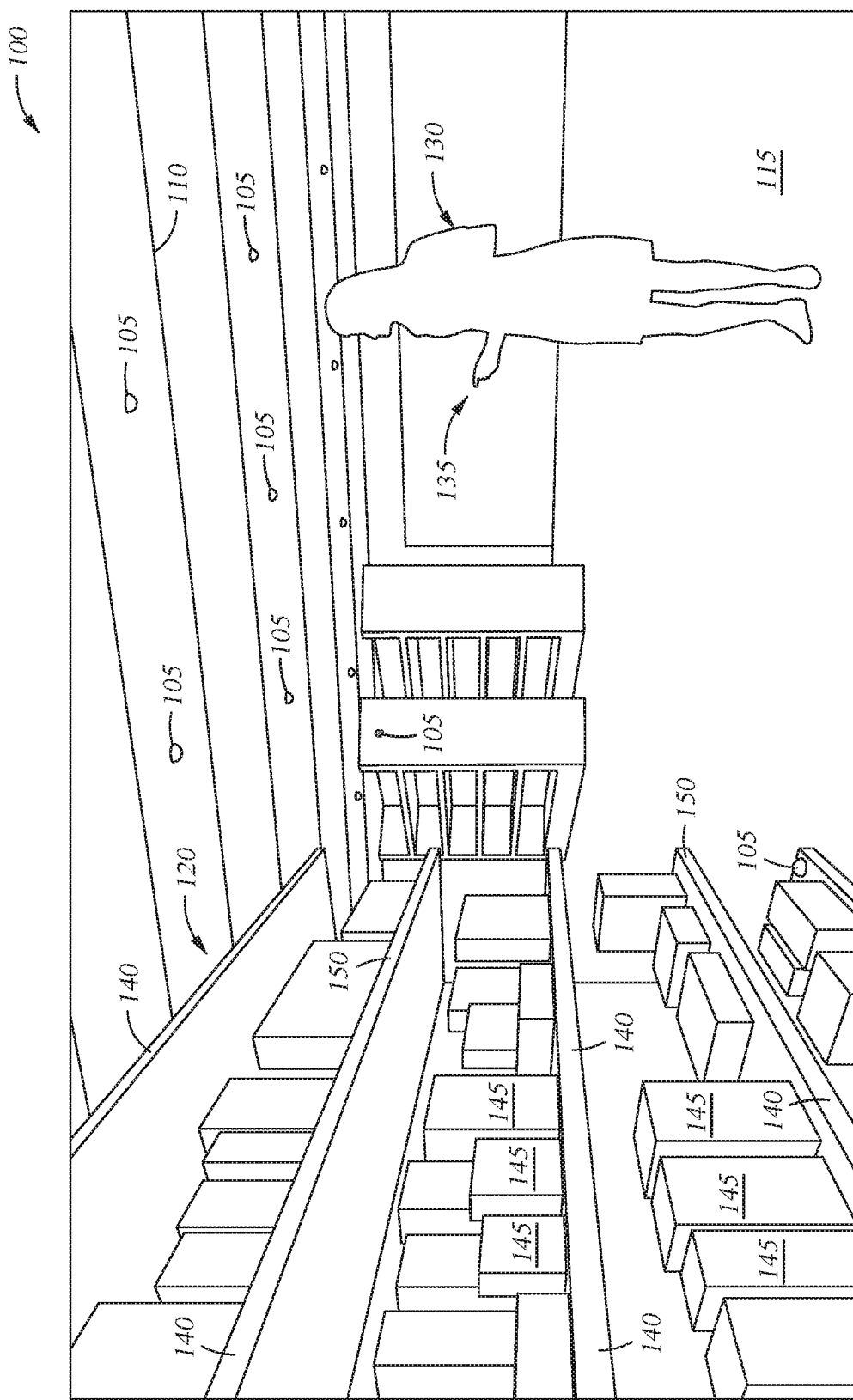
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as distributed sensors, point-of-sale (POS) terminals, digital signage, servers, and mobile or handheld computing devices to provide a seamless integration of mobile technologies and e-commerce into traditional experiences.

Using a system having one or more sensors within the environment, a retailer or other provider may acquire and process environmental data to maintain a virtual tracking record reflecting a person's actions within the environment and interactions with various items in the environment. The virtual tracking record may include the location of the person at any given point during the person's time in the environment. The virtual tracking record may also include a listing of items (i.e., including a first item set) that have been selected by a person for presentation during a subsequent checkout transaction, which may be indicated by placing the items within a receptacle, such as a shopping cart, basket, or bag. Furthermore, virtual tracking record may include information representing the person, such as identification information and current and past actions in the environment. Additionally, image and other sensor information representing the person including the shopping receptacle may be acquired at various locations within the environment, and image and other tracking processing may be performed to update a location or a current set of actions of the person.

While the person is traversing the environment the location and current actions will cause the system of the environment to perform various processing tasks. For example, the system may generate a processing request to identify the person by a facial recognition process. In one example, a customer gesture, such as picking up two items, may initiate a gesture recognition process to determine if a customer is comparing two items. In some examples, each of these requests has a different priority level, such that some requests may require prioritized (e.g., immediate) execution or completion while other requests do not need to be completed quickly. The large number of requests which can be generated or initiated based on the predefined actions performed by one or more persons in the environment may place a significant burden on the processing ability of the system. As greater numbers of people traverse the environment, ensuring that the resources of the system are utilized to efficiently complete the processing task requests becomes imperative.

Prioritizing processing task requests in a task request queue allows the system to quickly execute or complete task requests that are higher priority or that need to be completed quickly, and delay or wait to complete task requests that have a longer period of time before they need to be completed. This allows the system to provide a seamless experience to the person interacting with the environment and mitigates or prevents the person needing to wait at certain points in the environment for processing tasks to complete.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), Radio-frequency identification (RFID) sensors, and so forth. The sensor modules 105 may include processors and memory components configured to perform sensor processing task requests as described herein. The sensor modules 105 may also include actuating devices for providing a desired position and/or orientation of the included sensor(s). Generally, the sensor modules 105 or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions and gestures, such as determining the person's field of view relative to certain items, updating a virtual cart, transaction record, or virtual tracking record for the person's transactions and interactions in the environment, and so forth. The sensors may also be oriented toward locations corresponding to predefined activity zones in order to acquire better data of a person's interactions with the predefined activity zone, such as entering and exiting the zone, and selecting items in the zone.

In some embodiments, a person 130 in the environment may have a mobile computing device, such as a smartphone 135, that communicates or broadcasts information to one or more of the sensor modules 105 to aid in the updating of the virtual tracking record. For example, the person's smartphone 135 may include payment information, identification information, etc. that facilitate completion of a processing task such as identification of the person or a checkout transaction. In one embodiment, the mobile computing device may execute a store application that connects with the computing system of the environment (e.g., to store servers or other computing devices through the Internet). In one embodiment, the mobile computing device may be directly connected with one or more sensor modules 105 through wireless networks established within the environment (e.g., over Wi-Fi or Bluetooth). In one embodiment, the mobile computing device may couple with the one or more sensor modules 105 when brought within range, e.g., using Bluetooth or near-field communication (NFC).

The environment 100 also includes one or more shelving units 120 having shelves 140 that support various items 145. Though not shown, multiple shelving units 120 may be disposed in a particular arrangement in the environment 100, with the space between adjacent shelving units forming aisles through which people, such as customers and employees, may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, the shelving units 120 may include visual sensors or other sensor devices or I/O devices. The sensors or devices may couple with the person's smartphone 135 and/or other networked computing devices (including servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120 and other gestures, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary traversal of the environment, the person 130 may have a shopping receptacle in which the person places items after they are selected for purchase. Examples of shopping receptacles include shopping carts, baskets, or other containers that may be carried or otherwise transported by the person during the transaction. Upon completion of a traversal of the environment—for example, the person has selected all of the desired items—the person may approach a predefined checkout activity zone or a designated checkout area to perform a checkout transaction.

In some cases, the checkout transaction may have "touchless" aspects or may be entirely touchless. For example, visual sensors and other sensors included in the environment may acquire image information that is usable in processing tasks to identify the person, items within the shopping receptacle, etc. and that streamlines or otherwise facilitates the checkout transaction.

As will be discussed further herein, logic may be applied to the acquired sensor information to generate and performs processing task requests. In some cases, the logic may reflect legal and/or corporate requirements (e.g., reviewing attempted purchases of restricted items, such as tobacco or alcohol products) as well as loss-prevention or other security considerations.

In some examples, the completion of some or all of the processing requests for a person is required before a checkout process can be completed or before the person exits the environment. In some cases, the system will increase the priority of some task requests in order to ensure the completion of the processing task requests prior to checkout or departure from the environment 100, which in some cases may allow a person to seamlessly leave the environment without having to interact with a checkout terminal or stop and wait for processing tasks to be completed.

Figure 2:
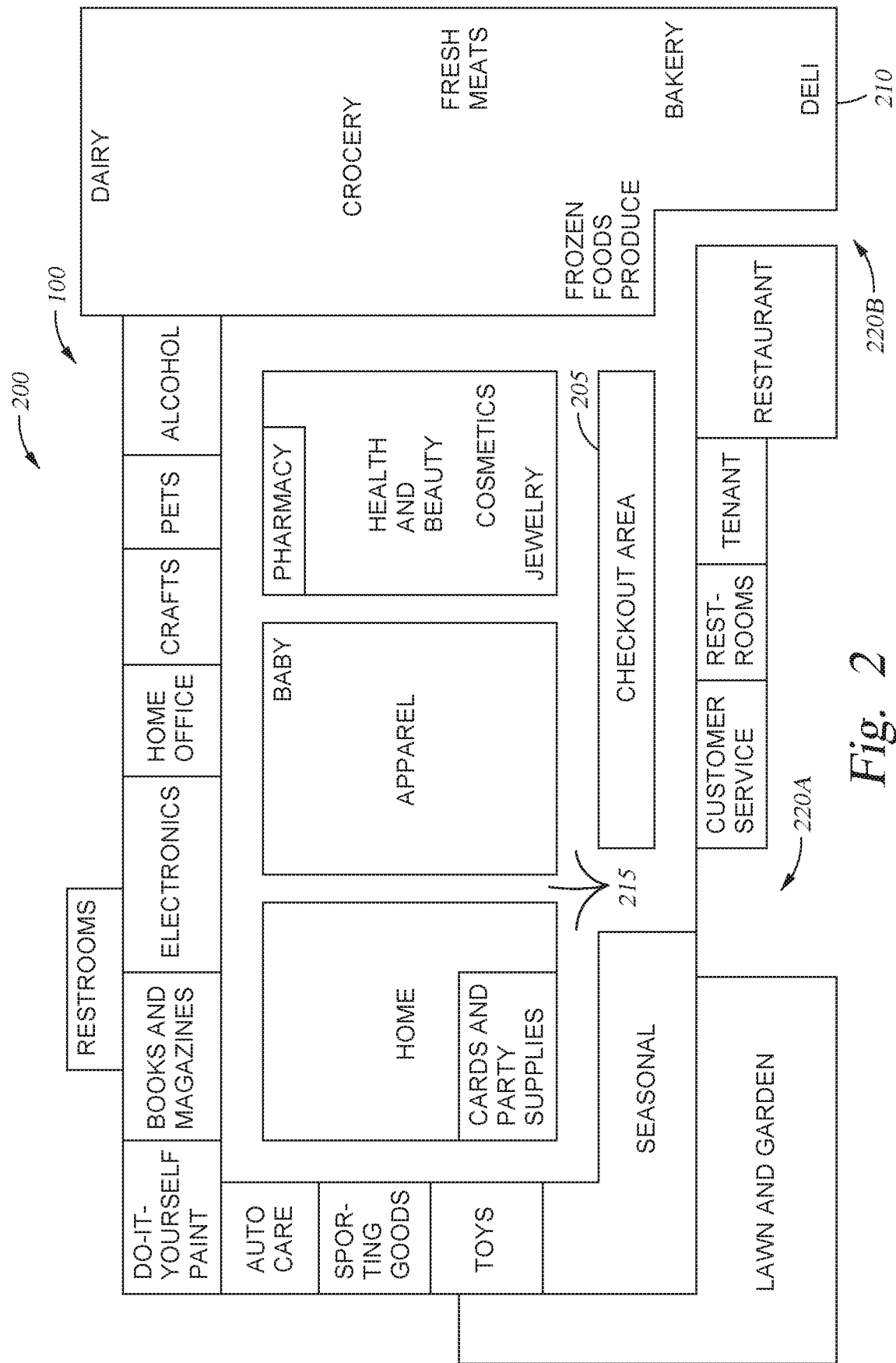
FIG. 2 illustrates an exemplary layout of an environment, according to one embodiment.

FIG. 2 illustrates an exemplary layout of an environment, according to one embodiment. Specifically, FIG. 2 depicts a projection of an exemplary floor plan 200 for the environment 100. The floor plan 200 includes areas corresponding to different departments, each of which includes a number of items available for selection and purchase. The departments (no reference numbers) are labeled with the corresponding name (e.g., "Home," "Apparel," "Seasonal," "Alcohol", etc.). Departments, such as grocery department 210, may be further subdivided into sub-departments (e.g., "Dairy," "Fresh Meats," etc.). Although not depicted, each department may include a number of shelving units or other structure that is suitable for storing, containing, and/or displaying items. The departments may be separated by one or more pathways 215, along which a person may travel to beneficially avoid navigating through certain departments.

During an exemplary interaction with environment 100, a person (e.g., a customer of the environment 100) may enter any number of departments and interact with various items included therein. Some examples of interactions include viewing items, handling items, comparing items, selecting items for purchase, adding items to a shopping receptacle, and so forth. Upon completion of the transaction, the person may transport selected items to a designated checkout area 205 having one or more checkout terminals or stations. The checkout area 205 may be disposed near points of entry into and/or exit from the environment, such as entrances/exits 220A, 220B. Checkout terminals within checkout area 205 may be manned (e.g., POS terminals) or unmanned (e.g., self-checkout terminals).

Figure 3:
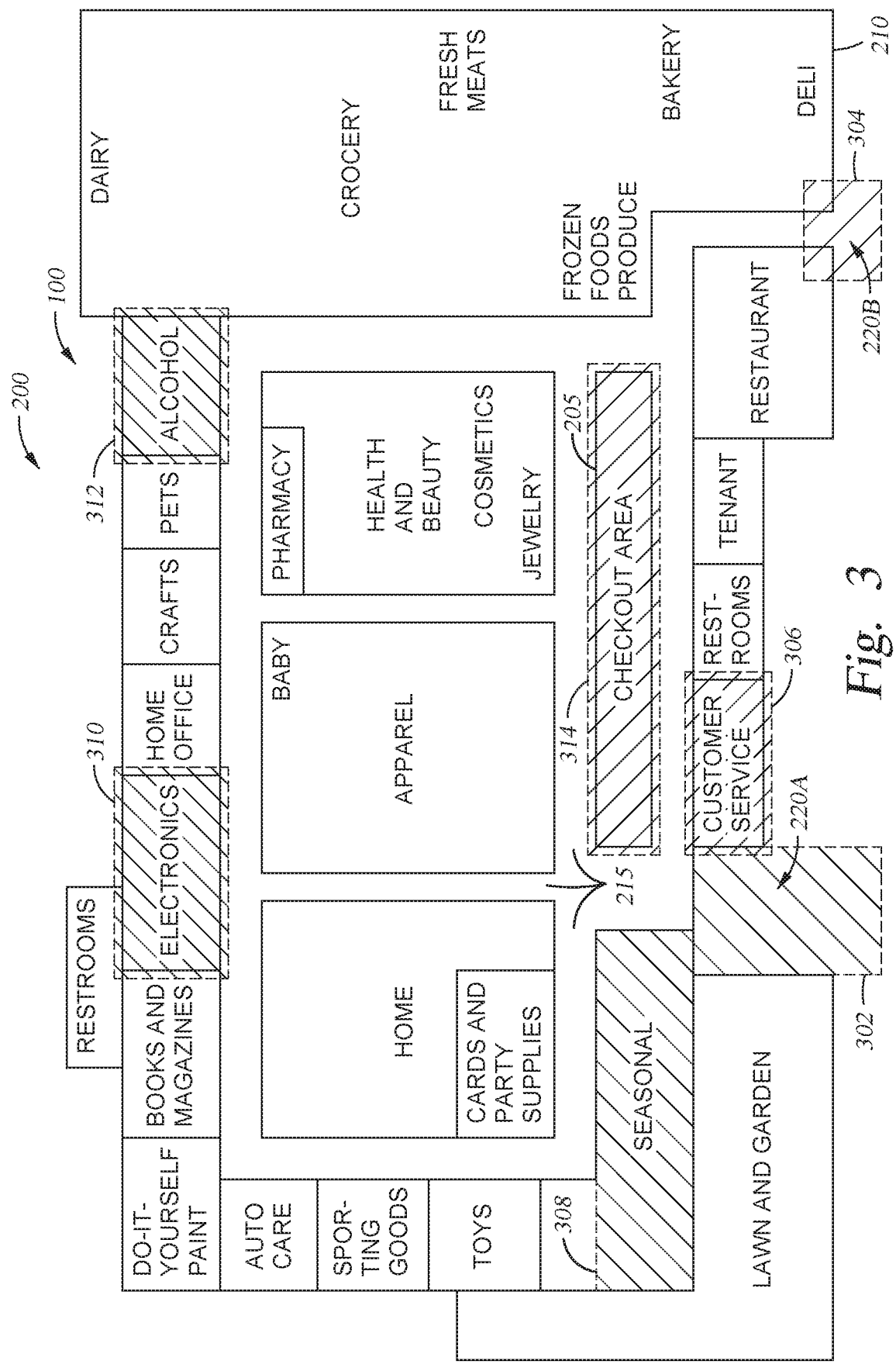
FIG. 3 illustrates an additional exemplary layout of an environment, according to one embodiment.

FIG. 3 illustrates an exemplary layout of environment 100, according to one embodiment. Specifically, FIG. 3 depicts a sample of predefined activity zones overlaying the exemplary floor plan 200 for the environment 100. Multiple sensor modules (e.g., sensor modules 105 of FIG. 1) disposed around the predefined activity zones may be used to update a virtual tracking record of a person (e.g., a customer of the environment 100) when the person enters, exits, or otherwise interacts with the predefined activity zone. For example, activity zones 302 and 304 correspond with entrances/exits 220A, 220B. Activity zones 308, 310, and 312 overlay specific departments such as seasonal, electronics, and alcohol. As another example, activity zone 314 overlays the checkout area 205.

During an exemplary interaction with environment 100, a person (e.g., a customer of the environment 100) may enter through activity zone 302 which adds an identification processing task request to a task request queue. As the person traverses environment 100, he or she may enter any of activity zones 308 and 310 which may add a promotional processing task request to a task request queue. In one example, the person entering the activity zone 312 adds an age verification processing task request to the task request queue to ensure that the person is legally able to purchase a restricted item (e.g., alcohol) that is included in or near the activity zone 312. At some later time, as the person approaches another activity zone such as activity zones 302, 304, 306, and/or 314, the importance of completing some processing task requests (e.g., identification or age verification) increases so that a transaction can be completed while the person is in activity zone 314 or otherwise before the person exits through activity zones 302 or 304, or so that a customer service representative is able to positively identify the person as he or she approaches a customer service desk. For example, as a person approaches activity zone 306, if an identification processing task request has not yet been processed in the task request queue, the priority of the identification task request may be increased so that the processing task request is completed prior to the person interacting with a customer service representative.

Figure 4A:
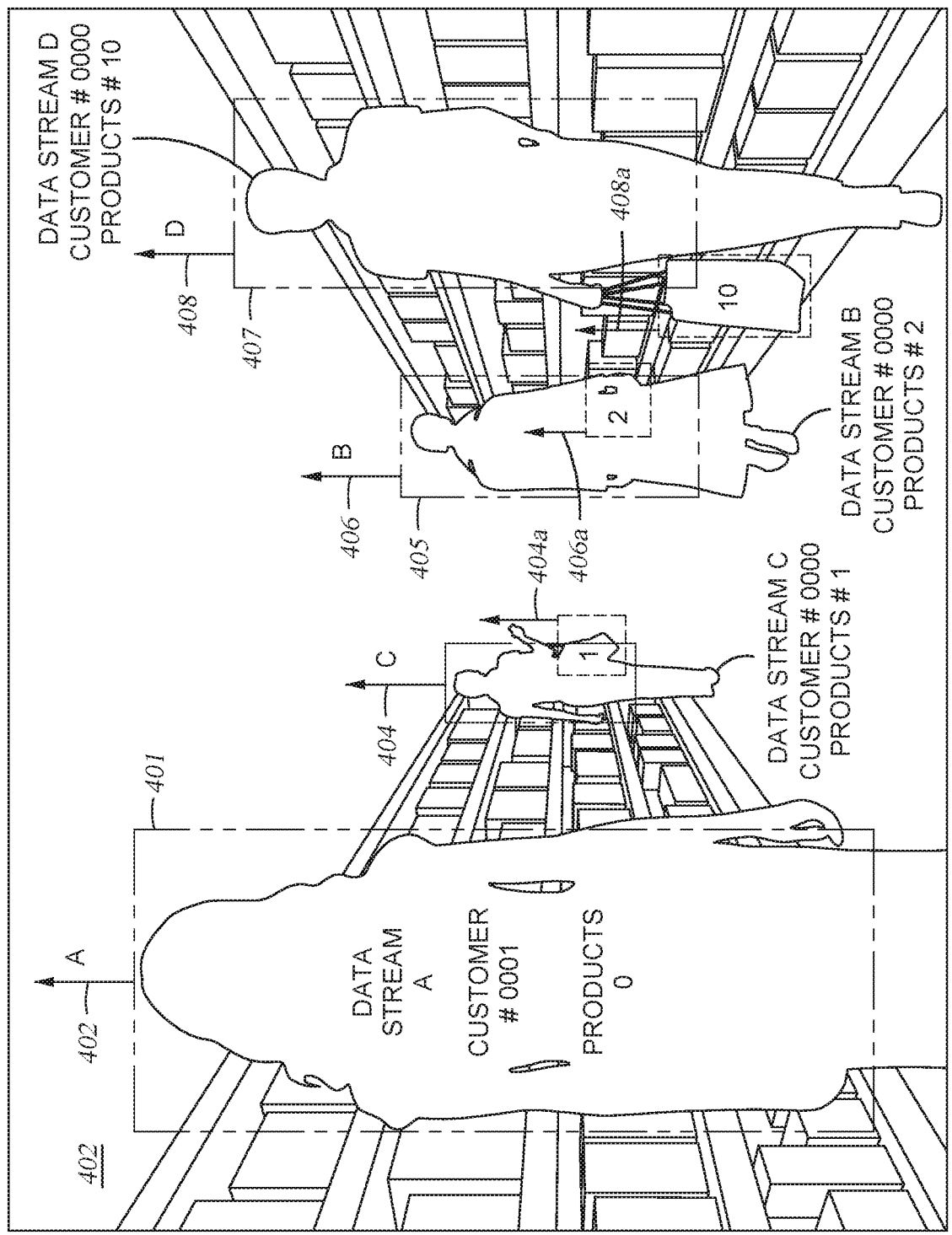
FIG. 4A illustrates an exemplary aisle of an environment, according to one embodiment.

FIG. 4A illustrates an exemplary aisle of an environment, such as environment 100 of FIG. 1, according to one embodiment. Specifically, FIG. 4A, shows several persons 401, 403, 405, 407 in an aisle, and exemplary virtual tracking records 402, 404, 406, and 408, which represent persons 401, 403, 405, and 407 respectively. In some examples, the system correlates processing task requests with the virtual tracking records 402, 404, 406, 408. As processing task requests are completed the virtual tracking records 402, 404, 406, 408 are updated with the outcome of the completed task requests. For example, after the completion of a facial recognition request for the person 401 is executed, the tracking record 402 may be updated with the identification (such as a name and a payment profile) of the person 401.

Additionally, virtual tracking records can be associated with or include transaction records, such as 404a, 406a, and 408a, which may include a number (count) of items selected by the person, identification of the items, and so forth.

Figure 4B:
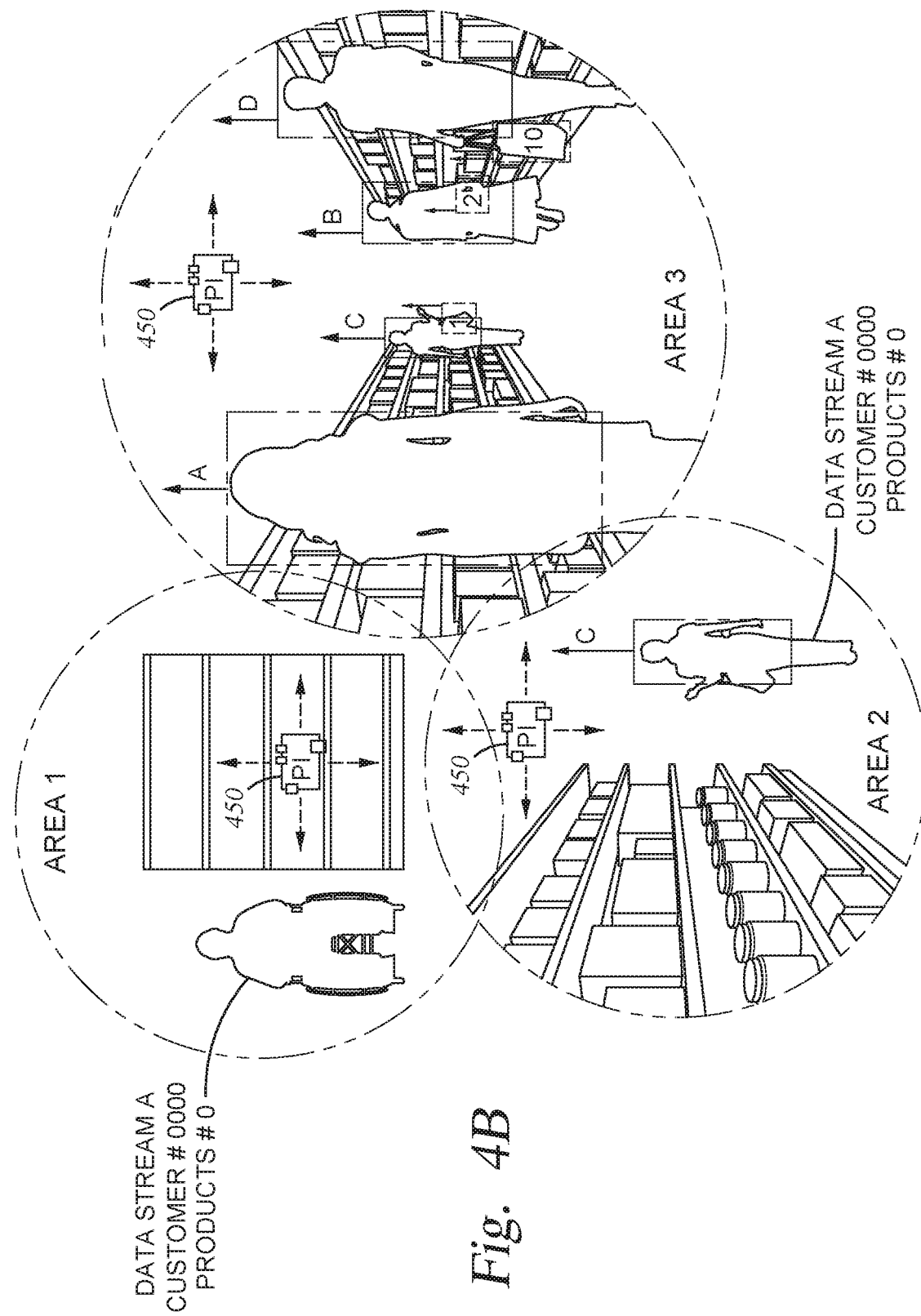
FIG. 4B illustrates multiple exemplary aisles of an environment, according to one embodiment.

Similarly, FIG. 4B illustrates multiple exemplary aisles of an environment (such as environment 100 of FIG. 1), according to one embodiment. Specifically, FIG. 4B shows several persons in multiple different aisles or areas of the environment 100. Each of the aisles includes at least one sensor module 450 (in some examples sensor module 450 comprises one of the sensor modules 105 of FIG. 1), which may include a processor and memory, and may also include other circuitry. In some examples, the sensor modules 450 may generate one or more sensor task requests at the processing circuitry of the module, preprocess the one or more sensor task requests, and/or communicate the one or more preprocessed sensor task requests to the task request queue using a network. In some examples, sensor task request comprise processing task requests generated and/or preprocessed at sensor modules 450. This allows for the processing ability included in the sensor modules 450 to aid in the execution and completion of processing tasks and relieves the processing burden on the system. For example, a sensor module 450 may include a camera which collects image data representing a face of a person in the environment. In some examples, processing circuitry of the sensor module 450 may perform an image processing task to identify that the face is included in the image data, and the sensor module 450 may generate a facial recognition request. The sensor module 450 may communicate this facial recognition request via the network with an external computing device, which may add the facial recognition request to the task request queue. In some embodiments, processing circuitry of the sensor module 450 may be used to perform some or all of the processing associated with the facial recognition request. The local processing by the sensor module 450 may be performed in coordination with the task request queue (e.g., according to the ordering of the processing task requests), or may be performed independently of other processing task requests of the task request queue. In this case, the external computing device that is primarily responsible for performing processing task requests in the task request queue will not need to execute the facial recognition request, and the system can update the virtual tracking record associated with the person identified through the facial recognition request.

Figure 5:
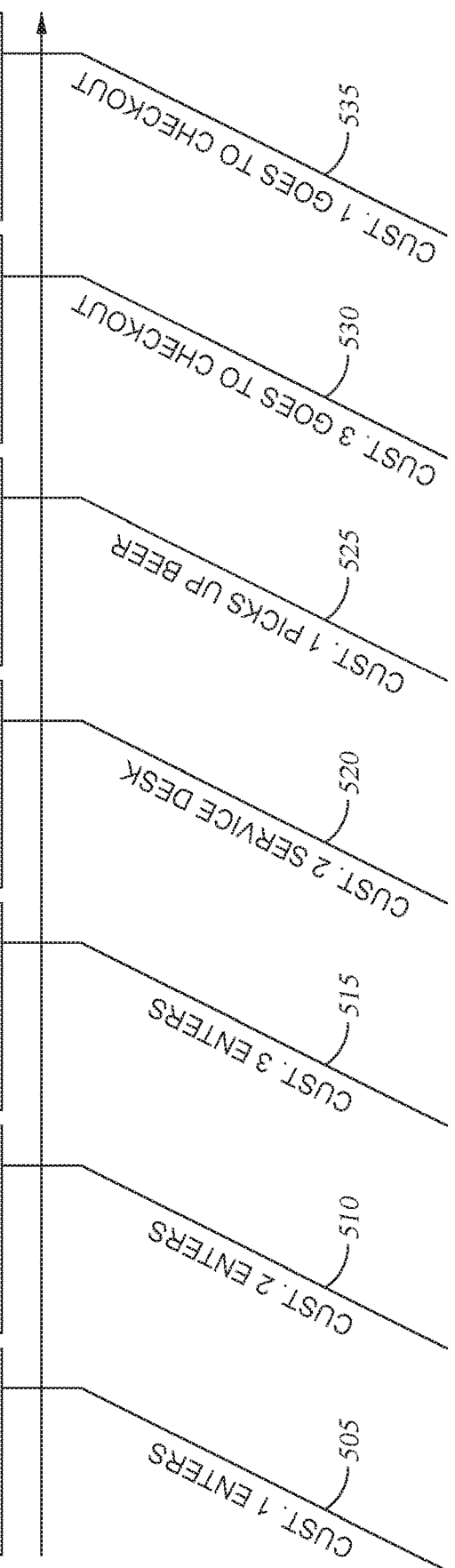
FIG. 5 illustrates an exemplary task request queue and an exemplary sequence of predefined actions performed by one or more persons in an environment, according to one embodiment.

FIG. 5 illustrates an exemplary task request queue 501 and an exemplary sequence of predefined actions 505, 510, 515, 520, 525, 530, 535 performed by one or more persons in an environment, according to one embodiment. Specifically, FIG. 5 shows the task request queue 501 as iteratively updated in response to detecting the predefined actions 505, 510, 515, 520, 525, 530, 535. While the predefined actions 505, 510, 515, 520, 525, 530, 535 are ordered sequentially in FIG. 5, in alternate implementations the predefined actions 505, 510, 515, 520, 525, 530, 535 may occur in a different order or with different timing, which may include two or more of the predefined actions 505, 510, 515, 520, 525, 530, 535 occurring partly or completely overlapping in time. In some cases, prior to the predefined action 510, the task request queue 501 may comprise one or more processing task requests and/or the system is executing processing task requests from the task request queue 501 on an ongoing basis. In some examples, the task request queue 501 may be configured to execute processing task requests as soon as a processing task request is added to the task request queue 501. In some examples, the task request queue 501 may already be executing previously-added processing task requests prior to the predefined actions 505, 510, 515, 520, 525, 530, 535.

In one example, as illustrated in FIG. 5 (and with further reference to FIG. 1), as a first person enters environment 100, a sensor module 105, or multiple sensor modules 105, may detect the first person in environment 100, and may assign the first person an identifier of Customer 1, which may serve as a placeholder identifier until the first person may be uniquely identified through, e.g., facial recognition. In some examples, the detection of one or more persons in environment 100 may be accomplished using artificial intelligence (AI), machine learning, deep learning, neural networks and/or other data analytics systems. In some examples, AI systems may use proprietary models, publicly available models, and/or a combination of both to detect one or more persons in the environment 100. In some examples, if this is the first identification of Customer 1 during a certain time period (e.g., first identification on a particular day), the system initiates a virtual tracking record associated with the Customer 1 identifier. In some examples, Customer 1 may enter an activity zone defined within the environment. For example, the detection of the predefined action 505, such as Customer 1 entering the environment 100 through an activity zone (such as activity zone 302 of FIG. 3), will add a processing task request, such as a facial recognition (FR) processing task request for Customer 1 (FR 1) to the task request queue 501. In some examples, the detection of one or more predefined actions may also be accomplished using artificial intelligence (AI), machine learning, deep learning, neural networks and/or other data analytics systems. In some examples, AI systems may use proprietary models, publicly available models, and/or a combination of both to detect one or more predefined actions in the environment 100. In one example, since the first person has recently entered the environment 100, identifying the first person through facial recognition may not be an immediate need, so that FR 1 is assigned a "normal" or "non-heightened" priority level. While the priority levels described in this example comprise a plurality of tiered categories (e.g., high, normal, and low), it is understood that the priority levels may have any suitable alternate form, such as different numbers of tiers, a range of continuous values, and so forth.

A second person is identified in the environment as the predefined action 510. For example, the second person may enter the environment 100. The system may then assign the second person an identifier of Customer 2 and create and/or update a virtual tracking record associated with the Customer 2 identifier. In some examples Customer 2 may perform a predefined action. For example, Customer 2 may enter the environment 100 through an activity zone (such as activity zone 304 of FIG. 3), which causes the system to add a processing task request, such as a FR processing task request for Customer 2 (FR 2), to the task request queue 501. As with Customer 1, Customer 2 has recently entered the environment and identifying the second person through facial recognition may not be an immediate need, so FR 2 is assigned the same "normal" or "non-heightened" priority level as FR 1.

A third person is identified in the environment as the predefined action 515. For example, the third person may enter the environment, and the system associates the third person an identifier of Customer 3, and may create or update a virtual tracking record associated with the Customer 3 identifier. In some examples Customer 3 may also perform a predefined action. For example, Customer 3 may enter the environment 100 through an activity zone (such as activity zone 304 of FIG. 3), will causes the system to add a processing task request, such as a FR processing task request for Customer 3 (FR 3) to the task request queue 501. As with Customer 1 and Customer 2, Customer 3 has recently entered the environment and identifying the third person through facial recognition may not be an immediate need, so FR 3 is assigned the same "normal" or "non-heightened" priority level as FR 1 and FR 2.

The system detects that Customer 2 performs another predefined action 520, such as entering another activity zone (e.g., activity zone 306 of FIG. 3), which indicates that Customer 2 is approaching the service desk. Since "personally" knowing a customer (e.g., knowing the customer's name and/or any history the customer has with the environment 100, such as past transactions, loyalty member, and so forth) may be beneficial from a customer service perspective, in some embodiments the system may increase the priority of positively identifying Customer 2 before the associated person reaches the customer service representative. For example, the normal priority level associated with FR 2 may be increased to a high priority task. Thus, the detection, by one or more sensor modules 105, of Customer 2 entering the activity zone 306, may cue the system to adjust the priority of the processing task FR 2 to a high level priority. In some cases, this may allow a customer service representative to greet Customer 2 by name and/or to anticipate Customer 2's needs, when he or she reaches the Customer Service Desk.

One or more sensor modules 105 detect that Customer 1 has performed another predefined action 525 such as selecting a restricted product. For example, Customer 1 may select an alcoholic beverage (e.g., beer) in activity zone 312 for a subsequent purchase. In this example, since alcohol is age restricted, an age verification (AV) processing task request associated with Customer 1 (AV 1) is added to the task request queue 501. In some examples, if age verification is only required to be performed prior to Customer 2 checkout or departing the environment, and the system determines that Customer 1 is expected to continue interacting with environment 100 for at least a predefined period (e.g., Customer 1 is still shopping), the system assigns a normal priority level to AV 1. In the iteration of the task request queue 501 corresponding to the predefined action 525, FR 2 having a high priority level has been completed.

The one or more sensor modules 105 detects that Customer 3 has performed another predefined action 530, such as entering another activity zone (e.g., an activity zone 314), indicating that Customer 3 is ready to checkout. In some examples, checkout in environment 100 may be a frictionless checkout, such that Customer 3 does not need to stop at a checkout stand or other predefined location, but can proceed through a checkout area 205 and exit the environment 100. In order to provide the frictionless checkout, Customer 3 needs to be positively identified so that Customer 3 can be checked out properly, such as charging Customer 3 for the items in the environment 100. Accordingly, responsive to the predefined action 530, the system adjusts the priority level of FR3 from normal to high.

In some examples, beyond adjusting a priority level of existing processing task requests in the task request queue 501, detecting the predefined action 530 can also add another processing task request to the task request queue 501. For example, when Customer 3 checkouts, a Loyalty Card Recognition (LCR) request may be added to the queue for Customer 3 (LCR 3). In the context of a frictionless checkout, the loyalty card discounts and promotions need not be processed at the time of Customer 3's checkout, and the system may assign LCR 3 to have a normal priority level. In the iteration of the task request queue 501 corresponding to the predefined action 530, FR 1 having a normal priority level has been completed.

One or more sensor modules 105 detects that Customer 1 has performed another predefined action 535, such as entering the activity zone 314, indicating that Customer 1 is ready to checkout. In this example, FR 1 has already been executed in the task request queue 501, meaning Customer 1 has been identified and associated with a name, account, payment method, etc. However, the age verification of Customer 1 (AV 1) has still not been processed. Since, due to the predefined action 525, age verification of Customer 1 is required before Customer 1 can depart environment 100, the system adjusts AV 1 to a high priority level. In the iteration of the task request queue 501 corresponding to the predefined action 535, FR 3 having a high priority level has been completed.

While not shown in FIG. 5, some processing task requests may be given a lower priority (e.g., lower than a normal priority) indicating the processing task request can be executed at a later time, such as when the processing demands on the system are lower, or when the task request queue has completed all normal and high priority task requests. For example, once the environment 100 closes for the day or is tracking a smaller number of persons, the task request queue may then complete the lower priority processing task requests.

Figure 6:
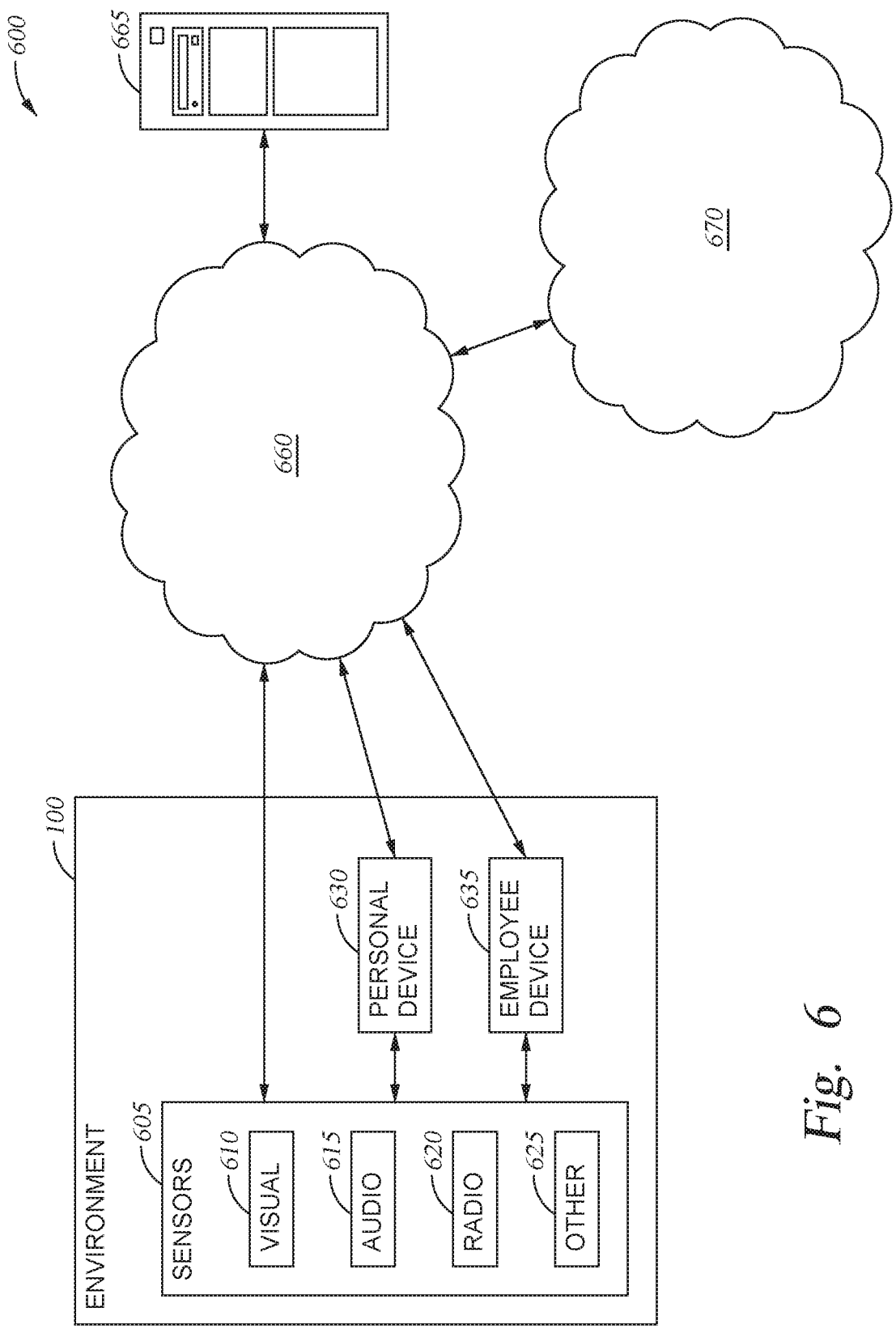
FIG. 6 illustrates an exemplary system to facilitate prioritizing processing task requests in an environment, according to one embodiment.

FIG. 6 illustrates an exemplary system 600 to facilitate prioritizing processing task requests in an environment, according to one embodiment. The system 600 includes a number of components that are disposed within the environment 100. The system 600 may also include components that are outside the environment 100—for example, a server 665 may be located remotely or may be proximately disposed to the environment (such as within a back room in the same building that is not accessible by customers). Additionally, a cloud-based computing model 670 may utilized in conjunction with the other components in order to prioritize and execute processing task requests.

Components within the environment 100 include one or more sensors 605 of various types, such as visual sensors 610, audio sensors 615, and radio sensors 620. The sensors 605 may also include other sensors 625 capable of providing meaningful information about customer actions and personal interactions within the environment, e.g., location sensors. The sensors 605 may be discrete sensor devices deployed throughout the environment 100 in fixed and/or movable locations. Sensors 605 may be statically included in walls, floors, ceilings, displays, or other non-sensor devices, or may be included in receptacles capable of being transported through the environment. In one embodiment, sensors 605 may include adjustable-position sensor devices, such as motorized cameras (i.e., an example of visual sensors 610) attached to a rail, wire, or frame. In one embodiment, sensors 605 may be included on one or more unmanned vehicles configured to travel through some or all of the environment 100, such as unmanned ground vehicles (UGVs) or unmanned aerial vehicles (UAVs or "drones"). Sensors 605 may also include sensor devices that are included in computing devices associated with the environment 100, such as personal devices 630, and employee devices 635. In some cases, the computing devices (or the component sensor devices) may be implemented as body-worn or carried devices.

Personal devices 630 and employee devices 635 may each include passive or actively-powered devices capable of communicating with at least one of the networked devices of system 600. One example of a passive device (which may be worn or carried) is a NFC tag. Active devices may include mobile computing devices, such as smartphones or tablets, or body-worn or carried devices such as a Google Glass™ interactive eyepiece (Glass is a trademark of Google Inc.). The personal devices 630 generally denote ownership or possession of the devices by customers within the environment 100, while the employee devices 635 denote ownership or possession by the retailer or other administrator of the environment 100. In some cases, employee devices 635 may be carried by employees and used in the course of their employment. Personal devices 630 and employee devices 635 may execute applications or other program code that generally enables various functions and features accessible using server 665 and/or other networked computing devices. In some embodiments, sensor devices that are included with the personal devices 630 or employee devices 635 may be included in the sensors 605.

Server 665 generally includes processor(s), memory, and communications capabilities and may perform various computing tasks to support the operation of the environment 100. Server 665 may communicate using various wired and/or wireless communications methods with sensors 605, and with other networked devices such as personal devices 630 and employee devices 635. Server 665 generally executes computer program code in which input data is received from networked devices, the input data is processed and/or stored by the servers, and output data is provided to networked devices for operation of the environment 100.

Network 660 may include one or more networks of various types, including a local area or local access network (LAN), a general wide area network (WAN), and/or a public network (e.g., the Internet). In one embodiment, various networked computing devices of the system 600 are interconnected using a LAN, and one or more computing devices (e.g., server 665, personal devices 630, cloud computing model 670) include connections to the Internet.

Figure 7:
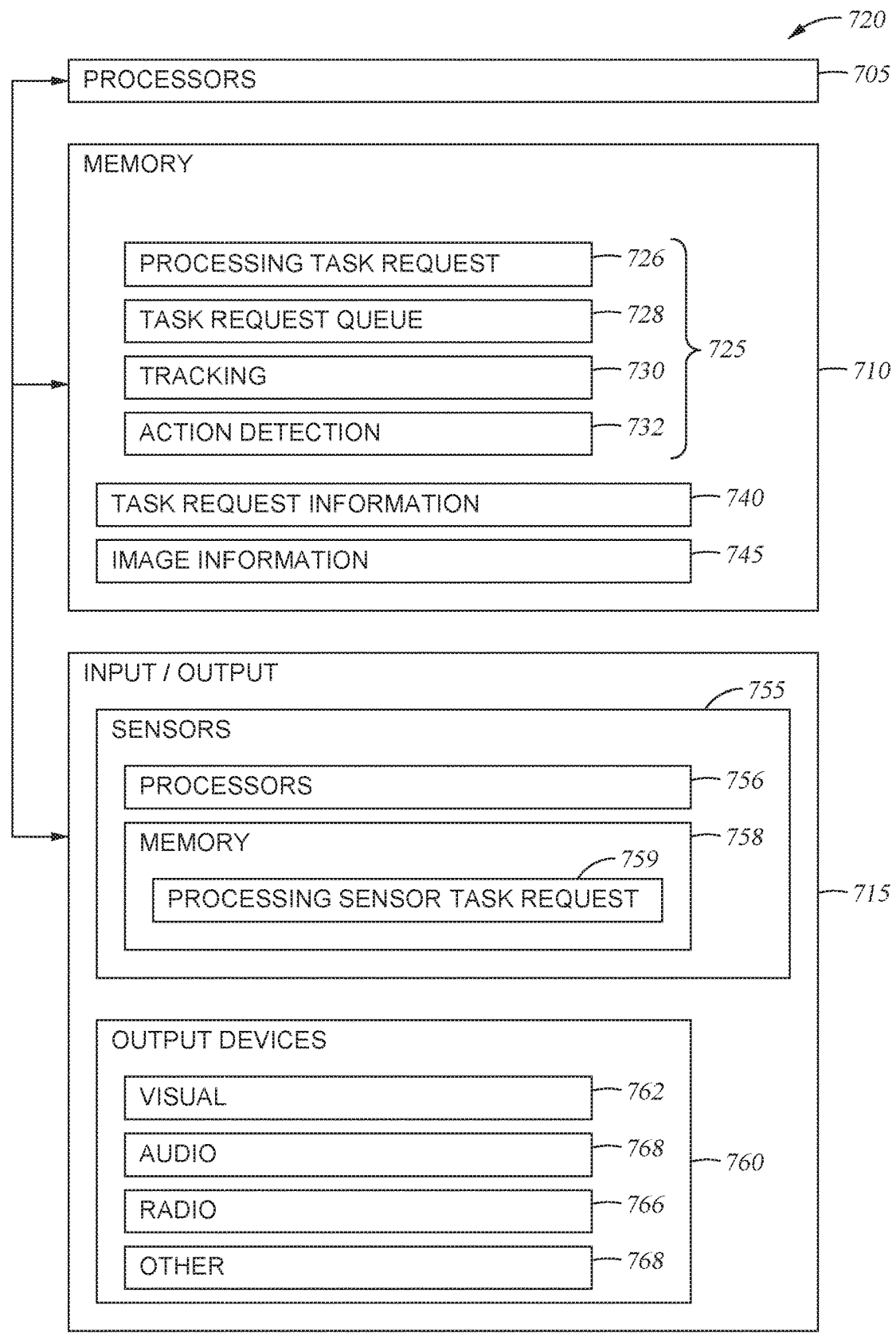
FIG. 7 is a block diagram illustrating operation of a system to facilitate prioritizing processing task requests in an environment 100, according to one embodiment.

FIG. 7 is a block diagram illustrating operation of a system to facilitate prioritizing processing task requests in an environment, according to one embodiment. Specifically, the arrangement 700 illustrates exemplary operation of the system 600. Arrangement 700 includes a number of processors 705, memory 710, and input/output 715, which are interconnected using one or more connections 720. In one embodiment, the arrangement 700 may be implemented as a singular computing device and connection 720 may represent a common bus. In other embodiments, arrangement 700 is distributed and includes a plurality of discrete computing devices that are connected through wired or wireless networking. The processors 705 may include any processing element suitable for performing functions described herein, and may include single or multiple core processors, as well as combinations thereof. Processors 705 may be included in a single computing device, or may represent an aggregation of processing elements included across a number of networked devices such as personal devices 630, etc. Similarly, the processors 756 located in Sensors 755 may include any processing element suitable for performing functions described herein, and may include single or multiple core processors, as well as combinations thereof.

Memory 710 (and memory 758) may include a variety of computer-readable media selected for their size, relative performance, or other capabilities: volatile and/or non-volatile media, removable and/or non-removable media, etc. Memory 710 may include cache, random access memory (RAM), storage, etc. Storage included as part of memory 710 may typically provide a non-volatile memory for the networked computing devices (e.g., server 665), and may include one or more different storage elements such as Flash memory, a hard disk drive, a solid state drive, an optical storage device, and/or a magnetic storage device. Memory 710 may be included in a single computing device or may represent an aggregation of memory included in networked devices. Memory 710 may include a plurality of modules 725 for performing various functions described herein. The modules 725 generally include program code that is executable by one or more of the processors 705.

As shown, modules 725 include processing task request module 726, task request queue module 728, and tracking module 730. The processing task request module 726 is generally configured to, in conjunction with the task request queue module 728 and task request information, perform the processing task requests. The task request queue module 728 is generally configured to maintain and/or update the task request queue including adding processing task request, adjusting the priorities level of processing task requests, and marking completed task requests as completed. The tracking module 730 is generally configured to identify persons in the environment 100 and update the virtual tracking record of each person with updated location information and with information from completed processing task requests. In some examples, the tracking model 730 may use artificial intelligence (AI), machine learning, deep learning, neural networks and/or other data analytics systems to identify persons in the environment 100. In some examples, AI systems may use proprietary models, publicly available models, and/or a combination of both to identify persons in the environment 100.

The action detection module 732 is generally configured to detect the completion or performance of one or more predefined actions in the environment 100. In some examples, the action detection module 732 may use artificial intelligence (AI), machine learning, deep learning, neural networks and/or other data analytics systems to detect the completion or performance of one or more predefined actions in the environment 100. In some examples, AI systems may use proprietary models, publicly available models, and/or a combination of both to detect the completion or performance of one or more predefined actions in the environment 100.

The modules 725 may also interact to perform certain functions. For example, processing task request module 726 during operation may make calls to the task request queue module 728, and so forth. The person of ordinary skill will recognize that the modules provided here are merely non-exclusive examples; different functions and/or groupings of functions may be included as desired to suitably operate the environment. Memory 710 may also include task request information 740 which includes information related needed to completed processing task requests and image information 745 which may be used by processing task request module 726 and tracking module 730 to parse image data, which may be accessed and/or modified by various of the modules 725. In one embodiment, the task request information 740 and image information 745 may be stored on the server 665 or on a separate database.

Input/output (I/O) 715 includes sensors 755, which includes the various sensors 605 of FIG. 6. Sensors 755 may be subdivided into worn (or carried) sensors that are worn or carried by persons within the environment, and distributed sensors that are disposed at fixed or movable locations within the environment. As shown the sensors may include processors 756 and sensor 758. Memory 758 may also include may include a plurality of modules for performing various functions described herein, such as Processing Sensor Task Request module 759. The Processing Sensor Task Request module 759, like processing task request module 726, is generally configured to, in conjunction with the task request queue module 728 and task request information, perform the processing task requests at the sensors 755, such as the sensor processing task requests.

I/O 715 may further include input devices (not illustrated) and output devices 760 that may be included to enhance the experience for persons interacting and traversing the environment. In some embodiments, personal devices 630, and employee devices 635 of FIG. 6 may include output devices 760, such as visual devices 764 (e.g., visual displays, indicators) and/or audio devices 762 (e.g., speakers) for communicating with persons during their transactions. The output devices 760 may include other devices 766 that provide information to people through tactile feedback (e.g., haptic devices) or using other sensory stimuli. The input devices include suitable devices capable of receiving input from persons, such as cameras, keyboards or keypads, touchscreens, buttons, inertial sensors, etc. I/O 715 may further include wired or wireless connections to an external network (e.g., network 665) using I/O adapter circuitry.

Figure 8:
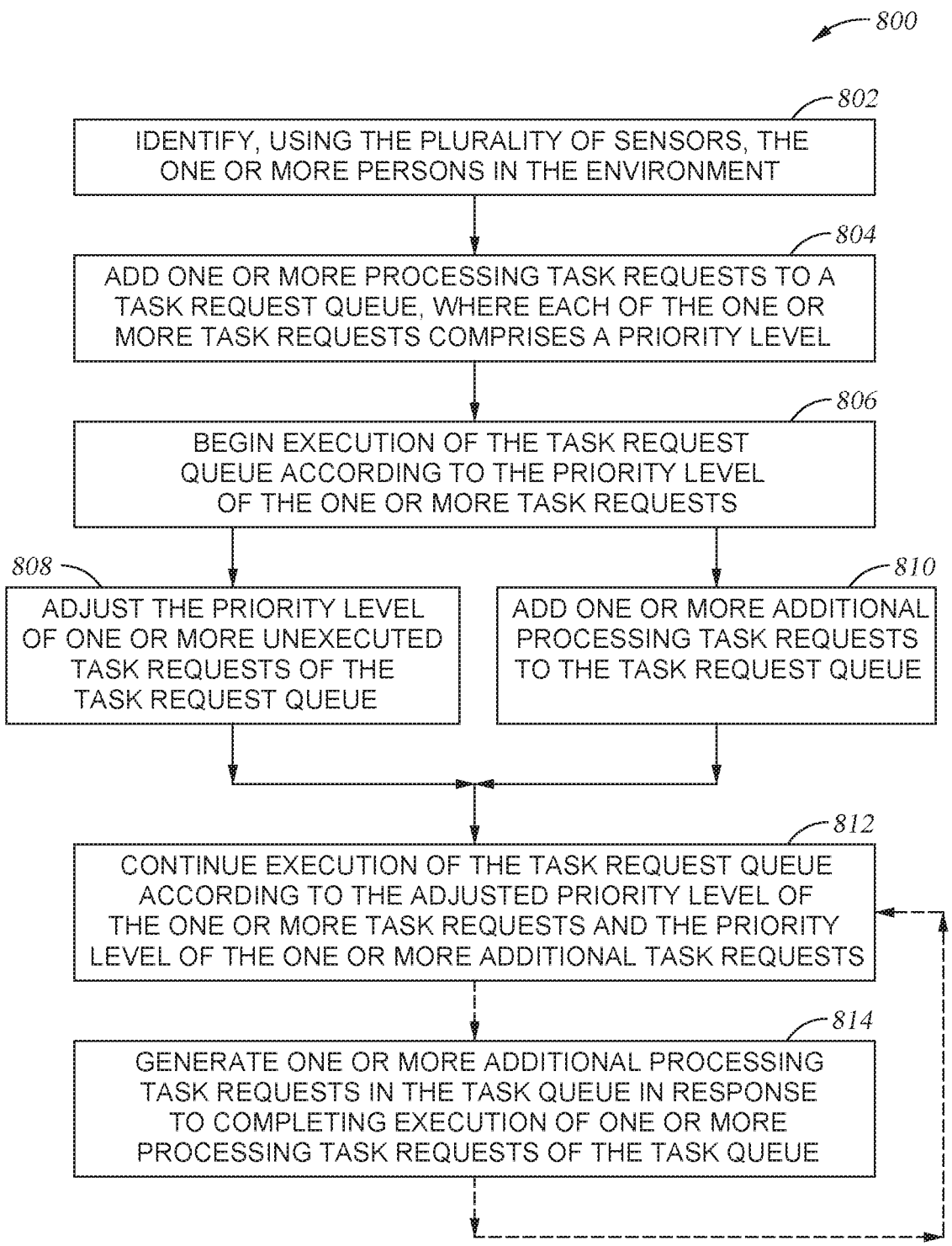
FIG. 8 illustrates a method to prioritize processing task requests in an environment, according to one embodiment.

FIG. 8 illustrates a method to prioritize processing task requests in an environment, according to one embodiment. Method 800 begins at block 802, where a person is first identified as being present in the environment. The system, in some examples using tracking module 730, identifies, using the plurality of sensors, the one or more persons in the environment. The tracking module 730 may create or update a virtual tracking recording identifying the person with a generic identifier, such as Customer 1.

At block 804, in response to detecting one or more predefined actions performed by the one or more persons, the system adds one or more processing task requests to a task request queue, where each of the one or more task requests comprises a priority level. In some examples, action detection module 732 detects one or more predefined actions performed by one or more persons in the environment 100, as described in at least step 505, 510, and 515 of FIG. 5. Examples of predefined actions include at least a person entering a predefined activity zone within the environment, the person leaving the predefined activity zone, the person selecting one of the plurality of items, the person performing a predefined gesture, and the person traveling in a specific direction within the environment.

In some examples, task request queue module 728 then adds the one or more processing task requests to a task request queue. In some examples, the processing task request may include a facial recognition request, a customer identification request, a gesture recognition request, a predicted customer action request, an age verification request, a customer loyalty lookup request, a current promotion request, a future promotion request, etc.

At block 806, using one or more computer processors communicatively coupled with the plurality of visual sensors: the system begins execution of the task request queue according to the priority level of the one or more task requests. In some examples, the processing task request module 726 begins executing or processing the processing task requests using processors 705. In some examples, the processing task request module 726 is configured to communicate one or more processing requests in the task request queue to a cloud based computing model related to the environment 100, wherein the cloud based computing module is configured to execute the processing task requests. This allows for scaling up and processing more of the processing task requests than the system in the environment may be able to handle. The processing task request module 726, may also interact with the cloud based computing model to assist in the execution of processing task requests such as querying data (e.g., facial recognition data) from a data repository in the cloud based computing model.

While the system is executing the processing task requests in the task request queue, the system may perform multiple steps such as shown in blocks 808 and 810.

At block 808, the system in response to detecting one or more subsequent predefined actions performed by the one or more persons, adjusts the priority level of one or more not yet completed task requests of the task request queue. In some examples, action detection module 732 detects the one or more subsequent predefined actions performed by one or more persons in the environment 100, such as described in at least steps 520, 525, 530, and 535 of FIG. 5. In some examples, task request queue module 728 then adjusts the priority level of the one or more not yet completed task requests.

Alternatively, at block 810 the system, in response to detecting one or more subsequent predefined actions performed by the one or more persons, adds one or more additional processing task requests to the task request queue. In some examples, action detection module 732 detects the one or more subsequent predefined actions performed by one or more persons in the environment 100, such as described in at least steps 510 and 515 of FIG. 5. In some examples, task request queue module 728 then adds one or more additional processing task requests to the task request queue.

At block 812, the system, continues execution of the task request queue according to the adjusted priority level of the one or more task requests and/or the priority level of the one or more additional task requests. In some examples, the processing task request module 726 continues or executing or processing the processing task requests using processors 705.

At block 814, the system optionally generates one or more additional processing task requests in the task queue in response to completing execution of one or more processing task requests of the task queue. For example, if a person is identified through a facial recognition request or a customer loyalty lookup request, a future promotion request may be added by task request queue module 728, to the task request queue in order to determine a promotion to provide the identified person.

Figure 9:
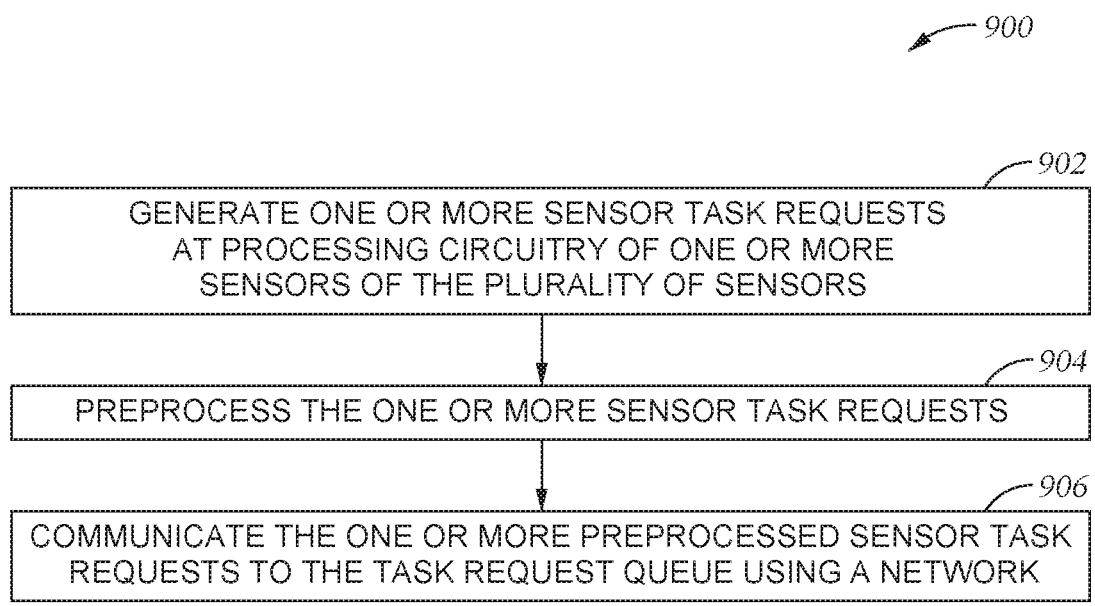
FIG. 9 illustrates an exemplary method to preprocess task request in an environment, according to one embodiment.

FIG. 9 illustrates an exemplary method to preprocess task request in an environment, according to one embodiment. Method 900 begins at block 902, where a one or more sensor task requests are generated at processing circuitry of one or more sensors of the plurality of sensors such as described in relation to FIG. 4B.

At block 904, the system, including the one or more of sensors, such as sensors 755, preprocesses the one or more sensor task requests. In some examples, processing sensor task request module 759 may be configured to preprocess the one or more sensor task requests. In some examples, the module 759 may be in communication with other sensors 755, memory 710, and cloud based computing model 670 in order to preprocess the one or more sensor task requests.

At block 906, the system communicates the one or more preprocessed sensor task requests to the task request queue using a network, such as through connection 720.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A computer-implemented method to prioritize processing task requests in an environment comprising a plurality of items available for selection by one or more persons, the environment comprising a plurality of sensors distributed throughout the environment, the method comprising:
    detecting one or more persons in the environment, wherein each of the one or more persons is associated with a virtual tracking record, wherein each respective virtual tracking record associated with each respective person of the one or more persons comprises:
        identification information and location information for the respective person during a current traversal of the environment,
        items currently selected for purchase by the respective person, and
        information tracking actions of the respective person in the environment;
    identifying, using the plurality of sensors, a first person of the one or more persons in the environment, wherein the first person is associated with a first virtual tracking record for a current traversal of the environment;
    in response to detecting one or more predefined actions performed by the first person during the current traversal of the environment, obtaining one or more predefined task requests associated with each of the one or more predefined actions and adding each of the one or more predefined task requests to a task request queue, wherein each of the one or more predefined task requests comprise processing tasks for updating the first virtual tracking record for the first person, wherein the task request queue comprises a plurality of task requests comprising each of the one or more predefined task requests and additional task requests for updating virtual tracking records associated with additional persons detected in the environment, and wherein each of the plurality of task requests is assigned a priority level; and using one or more computer processors communicatively coupled with the plurality of sensors:

beginning execution of the task request queue according to the priority level of the plurality of task requests beginning with a task request with a highest priority level when compared to other task requests in the plurality of task requests;

monitoring the one or more persons in the environment and updating respective virtual tracking records associated with each of the one or persons based on the monitoring;

detecting one or more subsequent predefined actions performed by the one or more persons in the environment in response to detecting the one or more subsequent predefined actions performed by the one or more persons in the environment:

adding one or more task requests associated with the one or more subsequent predefined actions to the plurality of task requests in the task request queue;

adjusting a priority level of one or more non-completed task requests of the plurality of task requests in the task request queue, wherein the priority level of the one or more non-completed task requests is adjusted to provide prioritized execution of the one or more task requests associated with the current traversal of the environment;

continuing execution of the task request queue according to the adjusted priority level of the plurality of task requests;

detecting the first person in a checkout area of the environment indicating a completion of the current traversal of the environment;

determining a set of one or more task requests of the plurality of task requests in the task request queue that are associated with the first person and are required to complete prior to the first person completing a checkout process;

adjusting a priority level of one or more non-completed task requests of the plurality of task requests in the task request queue, wherein the priority level each task in the set of one or more tasks is increased to provide prioritized execution of the set of one or more tasks;

continuing execution of the task request queue according to adjusted priority levels;

updating the first virtual tracking record upon completion of the set of task requests in the task request queue associated with the first virtual tracking record; and completing the checkout process in response to the updating.

2. The method of claim 1, wherein the one or more predefined task requests comprise one or more of:
a facial recognition request;
a customer identification request;
a gesture recognition request;
a predicted customer action request;
an age verification request;
a customer loyalty lookup request;
a current promotion request; and
a future promotion request.

3. The method of claim 1, wherein the one or more predefined actions comprise one or more of:
a person entering a predefined activity zone within the environment,
the person leaving the predefined activity zone,
the person selecting one of the plurality of items,
the person performing a predefined gesture, and
the person traveling in a specific direction within the environment.

4. The method of claim 1, further comprising:
generating one or more additional task requests in the task request queue in response to completing execution of one or more task requests of the task request queue.

5. The method of claim 1, further comprising:
generating one or more sensor task requests at processing circuitry of one or more sensors of the plurality of sensors;
preprocessing the one or more sensor task requests; and
communicating the one or more preprocessed sensor task requests to the task request queue using a network.

6. The method of claim 1, wherein the one or more task requests are communicated to a cloud based computing model related to the environment, wherein the cloud based computing module is configured to execute the task requests..

7. A system, to prioritize task requests in a retail environment, the system comprising:
one or more computer processors;
a plurality of sensors configured to collect data representing the retail environment;
a memory containing program code which, when executed by the one or more computer processors, performs an operation comprising:
detecting one or more persons in the environment, wherein each of the one or more persons is associated with a virtual tracking record, wherein each respective virtual tracking record associated with each respective person of the one or more persons comprises:
identification information and location information for the respective person during a current traversal of the environment,
items currently selected for purchase by the respective person, and
information tracking actions of the respective person in the environment;
identifying, using the plurality of sensors, a first person of a plurality of people in the environment, wherein the first person is associated with a first virtual tracking record for a current traversal of the environment;
in response to detecting one or more predefined actions performed by the first person during the current traversal of the environment, obtaining one or more predefined task requests associated with each of the one or more predefined actions and adding each of the one or more predefined task requests to a task request queue, wherein each of the one or more predefined task requests comprise processing tasks for updating the first virtual tracking record for the first person, wherein the task request queue comprises a plurality of task requests comprising each of the one or more predefined task requests and additional task requests for updating virtual tracking records associated with additional persons detected in the environment, and wherein each of the plurality of task requests is assigned a priority level; and using the one or more computer processors communicatively coupled with the plurality of sensors:
   beginning execution of the task request queue according to the priority level of the plurality of task requests beginning with a task request with a highest priority level when compared to other task requests in the plurality of task requests;
   monitoring the one or more persons in the environment and updating respective virtual tracking records associated with each of the one or persons based on the monitoring;
   detecting one or more subsequent predefined actions performed by the plurality of people in the environment;
   in response to detecting the one or more subsequent predefined actions performed by the plurality of people in the environment:
      adding one or more task requests associated with the one or more subsequent predefined actions to the plurality of task requests in the task request queue;
      adjusting a priority level of one or more non-completed task requests of the plurality of task requests in the task request queue, wherein the priority level of the one or more non-completed task requests is adjusted to provide prioritized execution of the one or more task requests associated with the current traversal of the environment; and
      continuing execution of the task request queue according to the adjusted priority level of the plurality of task requests;
   detecting the first person in a checkout area of the environment indicating a completion of the current traversal of the environment;
   determining a set of one or more task requests of the plurality of task requests in the task request queue that are associated with the first person and are required to complete prior to the first person completing a checkout process;
   adjusting a priority level of one or more non-completed task requests of the plurality of task requests in the task request queue, wherein the priority level each task in the set of one or more tasks is increased to provide prioritized execution of the set of one or more tasks;
   continuing execution of the task request queue according to adjusted priority levels; and
   updating the first virtual tracking record upon completion of the set of task requests; and
   completing the checkout process in response to the updating.

8. The system of claim 7, wherein the one or more predefined task requests comprise:
   a facial recognition request;
   a customer identification request;
   a gesture recognition request;
   a predicted customer action request;
   an age verification request;
   a customer loyalty lookup request;
   a current promotion request; and
   a future promotion request.

9. The system of claim 7, wherein the one or more predefined actions comprise one or more of:
   a person entering a predefined activity zone within the environment,
   the person leaving the predefined activity zone,
   the person selecting one of a plurality of items available for selection in the environment,
   the person performing a predefined gesture, and
   the person traveling in a specific direction within the environment.

10. The system of claim 7, wherein the operation further comprises:
   generating one or more additional task requests in the task request queue in response to completing execution of one or more task requests of the task request queue.

11. The system of claim 7, wherein the operation further comprises:
   generating one or more sensor task requests at processing circuitry of one or more sensors of the plurality of sensors;
   preprocessing the one or more sensor task requests; and
   communicating the one or more preprocessed sensor task requests to the task request queue using a network.

12. The system of claim 7, wherein the one or more requests are communicated to a cloud based computing model related to the environment, wherein the cloud based computing module is configured to execute the task requests.

13. A computer program product for prioritizing task requests in a retail environment, the retail environment comprising a plurality of sensors configured to collect data representing the retail environment, the computer program product comprising:
   a computer-readable storage medium having computer-readable program code embodied therewith, the computer-readable program code executable by one or more computer processors to perform an operation that includes:
      detecting one or more persons in the environment, wherein each of the one or more persons is associated with a virtual tracking record, wherein each respective virtual tracking record associated with each respective person of the one or more persons comprises:
         identification information and location information for the respective person during a current traversal of the environment,
         items currently selected for purchase by the respective person, and
         information tracking actions of the respective person in the environment;
      identifying, using the plurality of sensors, a first person of a plurality of people in the environment, wherein the first person is associated with a first virtual tracking record for a current traversal of the environment;
      in response to detecting one or more predefined actions performed by the first person during the current traversal of the environment, obtaining one or more predefined task requests associated with each of the one or more predefined actions and adding each of the one or more predefined task requests to a task request queue, wherein each of the one or more predefined task requests comprise processing tasks for updating the first virtual tracking record for the first person, wherein the task request queue comprises a plurality of task requests comprising each of the one or more predefined task requests and additional task requests for updating virtual tracking records associated with additional persons detected in the environment, and wherein each of the plurality of task requests is assigned a priority level; and using the one or more computer processors communicatively coupled with the plurality of sensors:

beginning execution of the task request queue according to the priority level of the plurality of task requests beginning with a task request with a highest priority level when compared to other task requests in the plurality of task requests;

monitoring the one or more persons in the environment and updating respective virtual tracking records associated with each of the one or persons based on the monitoring;

detecting one or more subsequent predefined actions performed by the plurality of people;

adding one or more task requests associated with the one or more subsequent predefined actions to the plurality of task requests in the task request queue;

adjusting the priority level of one or more non-completed task requests of the plurality of task requests in task request queue, wherein the priority level of the one or more non-completed task requests is adjusted to provide prioritized execution of the one or more task requests associated with the current traversal of the environment;

continuing execution of the task request queue according to the adjusted priority level of the plurality of task requests;

detecting the first person in a checkout area of the environment indicating a completion of the current traversal of the environment;

determining a set of one or more task requests of the plurality of task requests in the task request queue that are associated with the first person and are required to complete prior to the first person completing a checkout process;

adjusting a priority level of one or more non-completed task requests of the plurality of task requests in the task request queue, wherein the priority level each task in the set of one or more tasks is increased to provide prioritized execution of the set of one or more tasks;

continuing execution of the task request queue according to adjusted priority levels;

updating the first virtual tracking record upon completion of the set of task requests; and completing the checkout process in response to the updating.

14. The computer program product of claim 13, wherein the one or more predefined task requests comprise:
a facial recognition request;
a customer identification request;
a gesture recognition request;
a predicted customer action request;
an age verification request;
a customer loyalty lookup request;
a current promotion request; and
a future promotion request.

15. The computer program product of claim 13, wherein the one or more predefined actions comprise one or more of:
a person entering a predefined activity zone within the environment,
the person leaving the predefined activity zone,
the person selecting one of a plurality of items available for selection in the environment,
the person performing a predefined gesture, and
the person traveling in a specific direction within the environment.

16. The computer program product of claim 13, wherein the operation further includes:
generating one or more additional task requests in the task request queue in response to completing execution of one or more task requests of the task request queue.

17. The computer program product of claim 13, wherein the operation further includes:
generating one or more sensor task requests at processing circuitry of one or more sensors of the plurality of sensors;
preprocessing the one or more sensor task requests; and
communicating the one or more preprocessed sensor task requests to the task request queue using a network.

* * * * *

UNITED STATES PATENT AND TRADEMARK OFFICE
CERTIFICATE OF CORRECTION

| | |
|---|---|
| PATENT NO. | : 11,675,617 B2 |
| APPLICATION NO. | : 15/927853 |
| DATED | : June 13, 2023 |
| INVENTOR(S) | : Dean Frederick Herring et al. |

It is certified that error appears in the above-identified patent and that said Letters Patent is hereby corrected as shown below:

On the Title Page

Item (56), in Column 2, under "Other Publications", Line 1, delete "Requistion" and insert -- Requisition --.
On the page 2, item (56), in Column 1, under "Other Publications", Lines 3-4, delete "Requistion" and insert -- Requisition --.

In the Drawings

On sheet 2 of 10, in Figure 2, reference numeral 210, Line 2, delete "CROCERY" and insert -- GROCERY --.
On sheet 3 of 10, in Figure 3, reference numeral 210, Line 2, delete "CROCERY" and insert -- GROCERY --.

In the Specification

In Column 10, Line 35, delete "Sensors" and insert -- sensors --.
In Column 15, Line 5, delete "stand-alone" and insert -- standalone --.

In the Claims

In Column 17, Line 18, in Claim 1, delete "or" and insert -- or more --.
In Column 17, Lines 21-22, in Claim 1, delete "environment" and insert -- environment; --.
In Column 18, Line 28, in Claim 6, delete "requests.." and insert -- requests. --.
In Column 19, Line 14 (approx.), in Claim 7, delete "or" and insert -- or more --.
In Column 19, Line 51, in Claim 7, after "levels;" delete "and".
In Column 21, Line 13, in Claim 13, delete "or" and insert -- or more --.

Signed and Sealed this
Twenty-fourth Day of October, 2023

*Katherine Kelly Vidal*
Katherine Kelly Vidal
*Director of the United States Patent and Trademark Office*